(12) United States Patent
Holcomb et al.

(10) Patent No.: US 11,198,132 B2
(45) Date of Patent: Dec. 14, 2021

(54) FOLIAGE SHREDDER

(71) Applicants: Russell Elbridge Holcomb, Grass Valley, CA (US); Ryder Everette Holcomb, Grass Valley, CA (US); John Gilbert Shingle, Auburn, CA (US)

(72) Inventors: Russell Elbridge Holcomb, Grass Valley, CA (US); Ryder Everette Holcomb, Grass Valley, CA (US); John Gilbert Shingle, Auburn, CA (US)

( * ) Notice: Subject to any disclaimer, the term of this patent is extended or adjusted under 35 U.S.C. 154(b) by 447 days.

(21) Appl. No.: 15/934,832

(22) Filed: Mar. 23, 2018

(65) Prior Publication Data

US 2018/0214886 A1    Aug. 2, 2018

Related U.S. Application Data

(60) Provisional application No. 62/449,214, filed on Jan. 23, 2017.

(51) Int. Cl.
*B02C 18/06* (2006.01)
*A01G 3/00* (2006.01)
(Continued)

(52) U.S. Cl.
CPC .............. *B02C 18/06* (2013.01); *A01G 3/002* (2013.01); *B02C 18/12* (2013.01); *A01G 22/60* (2018.02);
(Continued)

(58) Field of Classification Search
CPC ... B02C 18/06; B02C 18/12; B02C 2023/165; B02C 2201/066; B02C 2018/162; A01G 3/002; A01G 22/60
See application file for complete search history.

(56) References Cited

U.S. PATENT DOCUMENTS 3,877,207 A * 4/1975 Lemelson ............. E01H 1/0836
56/13.2
4,301,717 A * 11/1981 Knees ..................... A47J 27/14
366/185
(Continued)

OTHER PUBLICATIONS

Triminator Dry Owner's Manual, 2013, https://hydrobuilder.com/media/pdf/instructions/2016_Triminator_Dry_Safety.pdf (Year: 2013).*
(Continued)

*Primary Examiner* — Adam J Eiseman
*Assistant Examiner* — Amer Islam
(74) *Attorney, Agent, or Firm* — Heisler & Associates (57) ABSTRACT

A foliage shredder that can shred inputted foliage matter into uniform sized particles without pulverizing the inputted foliage matter includes a housing, a shredding axle, a motor, a stand, a digital timer, a power cord, and a lid. The shredding axle is concentrically positioned within a cylindrical compartment of the housing and rotatably coupled to a rotor of the motor. A stator of the motor is externally connected to the housing and electrically connected to the power cord through the digital timer. The lid is terminally attached to the housing thus closing the cylindrical compartment. The cylindrical compartment functions as a container unit for the inputted foliage as the electrically powered shredding axle shreds the inputted foliage into uniform sized particles.

17 Claims, 11 Drawing Sheets

(51) Int. Cl.
  *B02C 18/12* (2006.01)
  *A01G 22/60* (2018.01)
  *B02C 18/16* (2006.01)
  *B02C 23/16* (2006.01)
(52) U.S. Cl.
  CPC .. *B02C 2018/162* (2013.01); *B02C 2023/165* (2013.01); *B02C 2201/066* (2013.01)

(56) References Cited

U.S. PATENT DOCUMENTS

| | | | | |
|---|---|---|---|---|
| 5,020,309 | A * | 6/1991 | Hopkins | A01D 42/005 15/330 |
| 5,155,975 | A * | 10/1992 | Knowler | B02C 18/14 141/272 |
| 9,943,038 | B2 * | 4/2018 | Holcomb | B26D 1/38 |
| 2014/0263774 | A1 * | 9/2014 | Matlin | B02C 18/0007 241/28 |
| 2015/0238971 | A1 * | 8/2015 | Lietaer | B02C 18/141 241/59 |

OTHER PUBLICATIONS

Monster Gardens, Automatic Dry Flower Trimmer | Triminator Dry Trimmer | Best Trimmer for Dry Product Dry Flower Buds, Nov. 17, 2014, https://www.youtube.com/watch?v=dwasNK5U_Sw (Year: 2014).*

Flowtron LE-900 The Ultimate Mulcher Electric Leaf Shredder, 2011, https://www.amazon.com/Flowtron-Ultimate-Mulcher-Electric-Shredder/dp/B00006XMTM/ref=cm_cr_arp_d_product_top?ie=UTF8 (Year: 2011).*

Flowtron Electric Leaf Eater TheUltimate Mulcher, 2011, https://images-na.ssl-images-amazon.eom/images/l/91q7KFjUYpS.pdf (Year: 2011).*

Neo Farms LLC, "Hi Tec 110 cup Cannabis Commercial Shredder for Extraction and Joints", May 25, 2016, Hi Tec 110 cup Cannabis Commercial Shredder for Extraction and Joints, https://www.youtube.com/watch?v=ySdpe9D8rzg (Year: 2016).*

* cited by examiner

FOLIAGE SHREDDER

The current application claims a priority to the U.S. Provisional Patent application Ser. No. 62/449,214 filed on Jan. 23, 2017.

FIELD OF THE INVENTION

The present invention relates generally to an apparatus capable of shredding foliage matter leftover from trimming a plant. More specifically, the present invention utilizes an electrically powered shredding unit to shred the inputted foliage matter into uniform sized particles without pulverizing the inputted foliage matter.

BACKGROUND OF THE INVENTION

Plant trimmings such as flowers, herbs, tea leaves, medicinal leaves, and any other types of foliage matter are generally shredded through complicated and large processing systems that are normally installed within a processing factory. As a result, these processing systems and processing factories require large sum of investments to set up and need to process large quantity of foliage matter on daily bases to be profitable. Furthermore, these processing systems generate a large quantity of waste material due to the low efficiency of the systems. Due to these drawback, there is a specific need for a portable and inexpensive shredding unit that can handle small to large quantity of foliage matter.

It is therefore an objective of the present invention to provide a foliage shredding unit that can shred inputted foliage matter into uniform sized particles without damaging or compromising the quality of the foliage matter. More specifically, the present invention handles and shreds plant trimmings such as flowers, herbs, tea leaves, medicinal leaves, and any other types of foliage matter through an electrically powered shredding unit. The present invention utilizes a quiet and efficient shredding process that does not pulverize the inputted foliage matter. Once the shredding process is finished, the uniform sized particles can be removed or discharged from the present invention to be packaged and distributed.

DETAIL DESCRIPTIONS OF THE INVENTION

All illustrations of the drawings are for the purpose of describing selected versions of the present invention and are not intended to limit the scope of the present invention.

The present invention is a foliage shredder that can shred plant trimmings into uniform sized particles. More specifically, the present invention accepts plant trims such as herbs, flowers, medicinal leaves, tea leaves, and any other type of foliage matter so that the plant trimmings can be quickly shredded into uniform sized particles without pulverizing the inputted foliage matter. The present invention functions as a portable and inexpensive apparatus that can implement the shredding process for plant trimmings in comparison to traditional factory setting environments.

Figure 1:
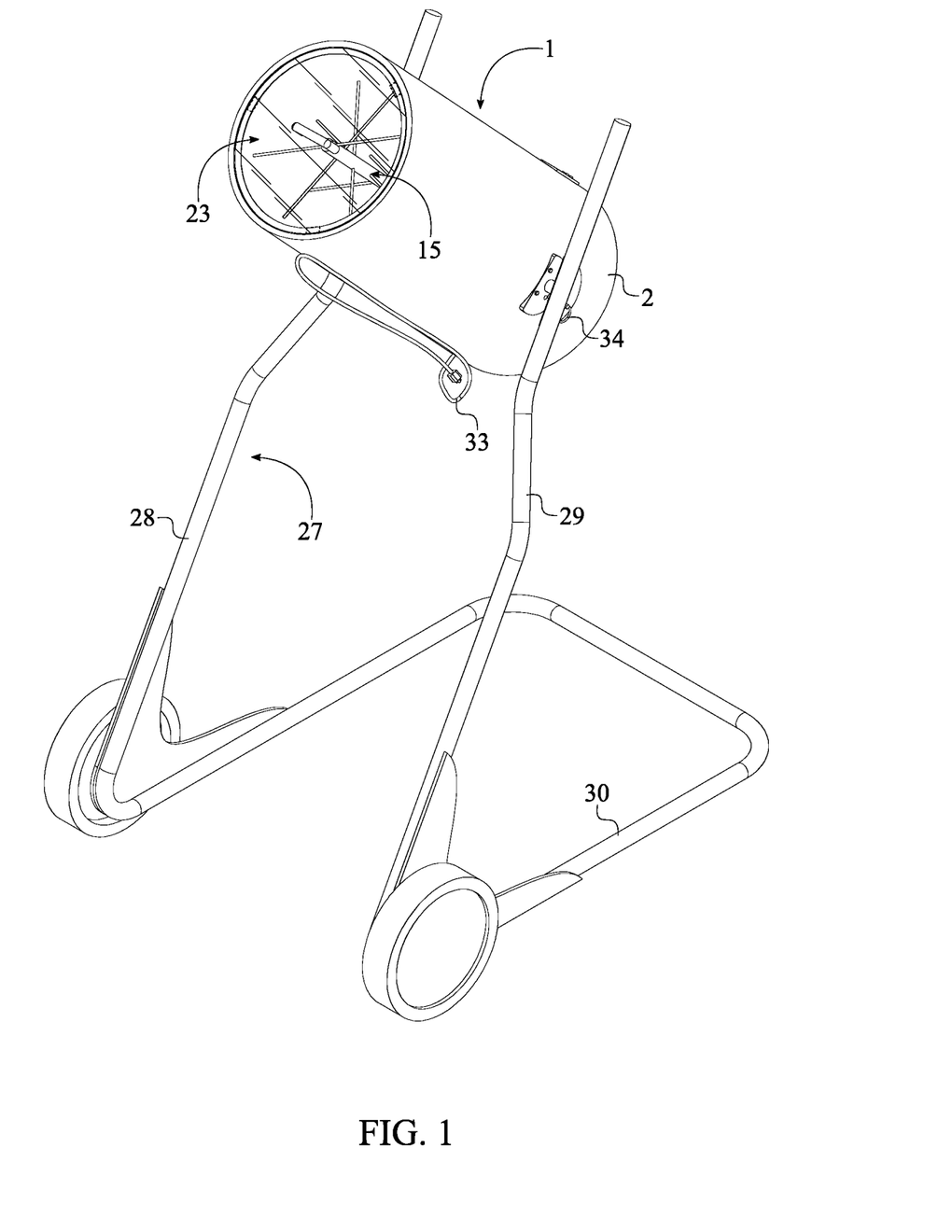
FIG. 1 is a top perspective view for the preferred embodiment of the present invention, showing the transparent lid.
Figure 2:
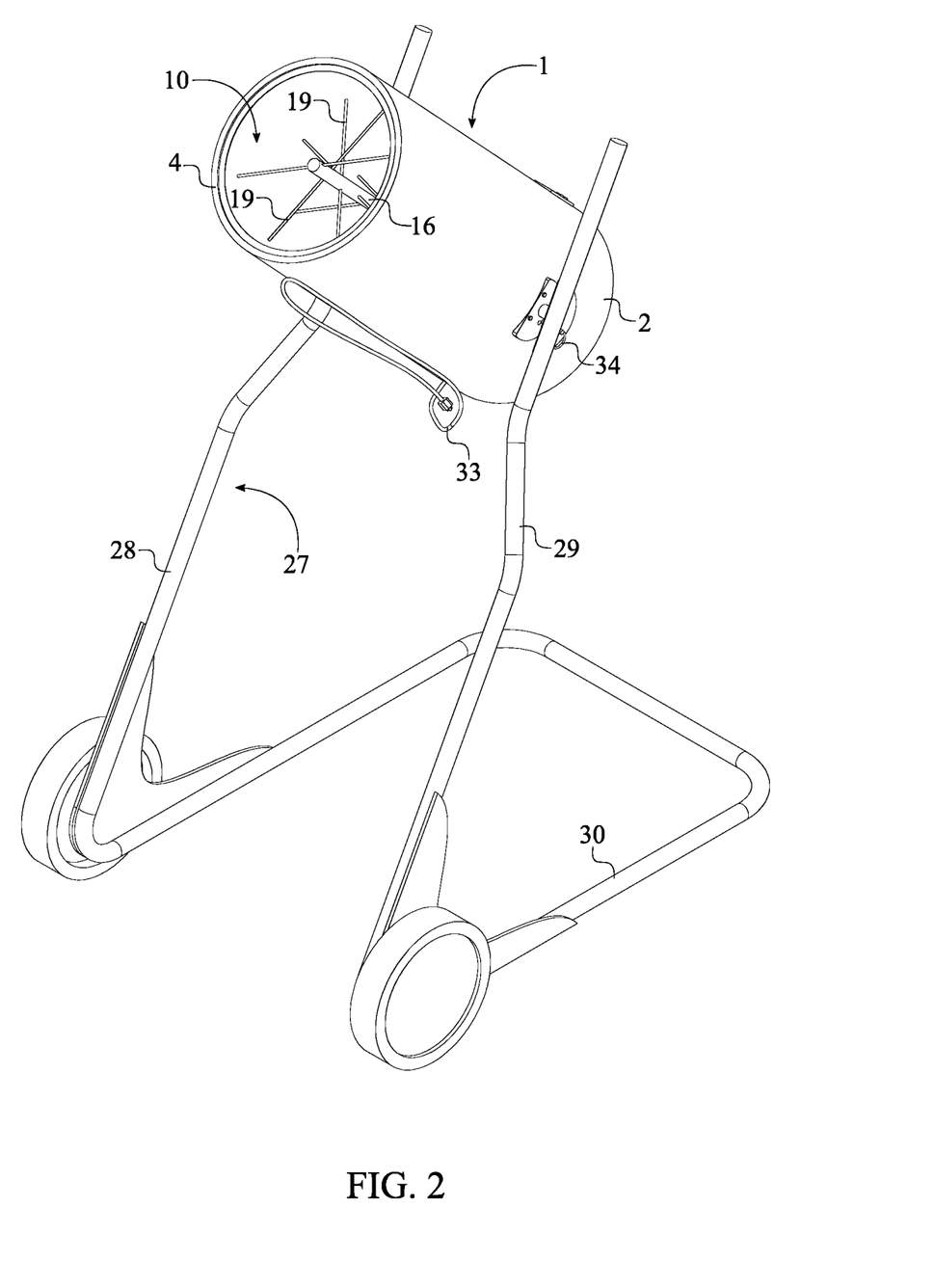
FIG. 2 is a top perspective view for the preferred embodiment of the present invention, showing the front opening without the transparent lid.
Figure 3:
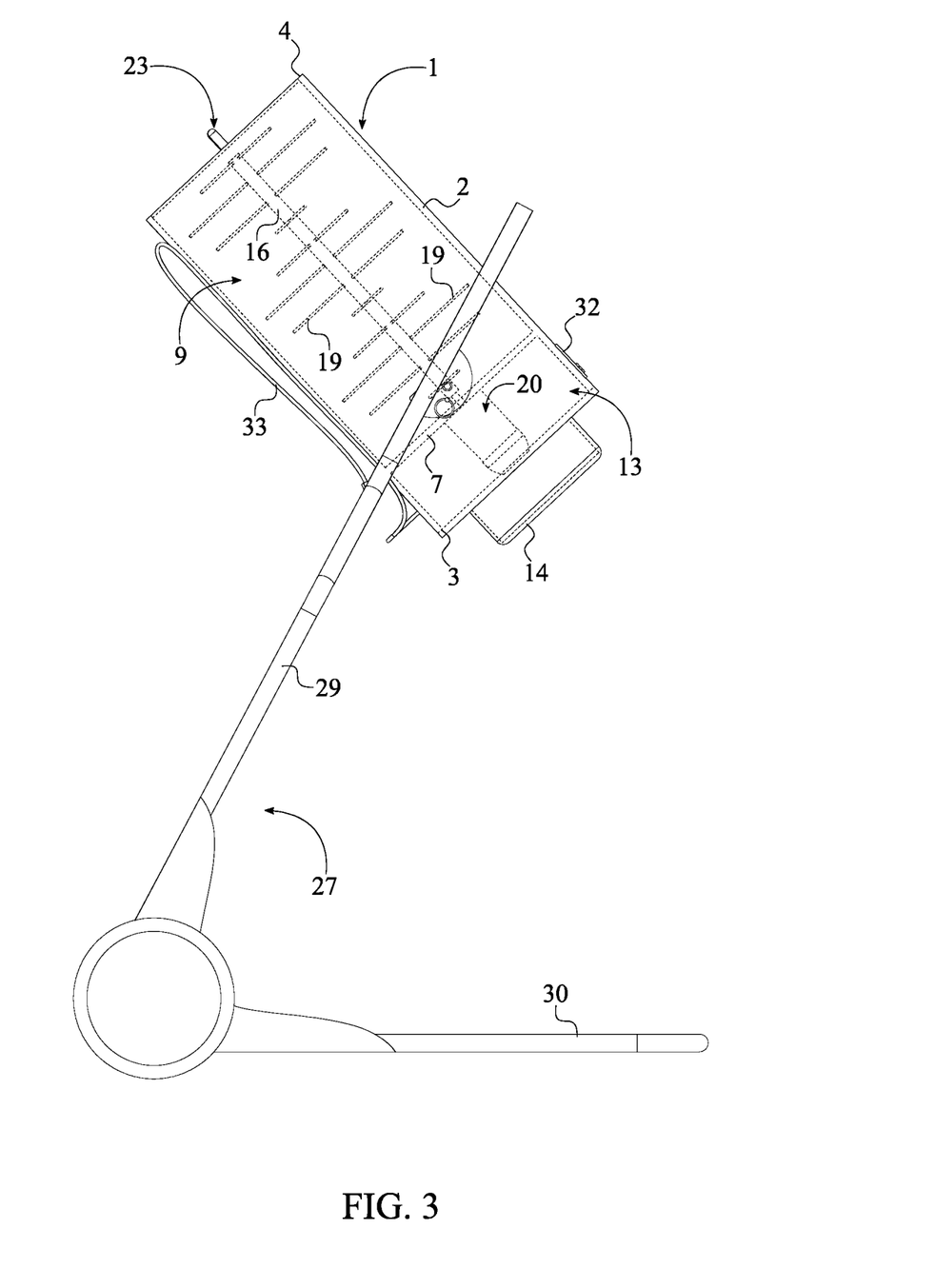
FIG. 3 is a side view for the preferred embodiment of the present invention, wherein the dash lines illustrates the inner components of the within the housing.

The present invention comprises a housing 1, a shredding axle 15, a motor 20, a stand 27, a digital timer 32, and a power cord 33, as shown in FIG. 1-3, and the housing 1 comprises a lateral wall 2, a base plate 7, and a cylindrical compartment 9. In reference to the general configuration of the present invention, the lateral wall 2 is perimetrically connected around the base plate 7 so that the cylindrical compartment 9 can be delineated by the lateral wall 2 and the base plate 7. The housing 1 functions as the storage unit for the plant trimmings in order to initiate the shredding process. The lateral wall 2 is rotatably mounted to the stand 27 so that the housing 1 can be elevated from the ground surface for easy access. Furthermore, the stand 27 also provides stability to the housing 1 and functions as the portable means of transportation within the present invention. A stator 21 of the motor 20 is externally mounted onto the base plate 7 thus securing the motor 20 within the present invention. The shredding axle 15 is concentrically positioned within the cylindrical compartment 9 and rotatably coupled to a rotor 22 of the motor 20. As a result, the shredding axle 15 can rotate within the cylindrical compartment 9 converting the plant trimmings into uniform sized particles. In order to apply rotational movement to the shredding axle 15, the motor 20 is electrically connected to the power cord 33 through the digital timer 32, that is externally mounted onto the lateral wall 2. Once the power cord 33 is attached to an external power outlet, the user is able to set a time limit as the operational time duration for the motor 20 through the digital timer 32. Then, the motor 20 is electrically powered for the duration of the time limit thus completing the shredding process for the plant trimmings through the rotational movement of the shredding axle 15.

The housing 1 that contains the plant trimming during the shredding process is preferably formed into a cylindrical shape to be consistence with the cylindrical compartment 9. In reference to FIG. 1-3, the housing 1 further comprises a front opening 10, a first mounting bracket 11, and a second mounting bracket 12 in addition to the aforementioned components. A first edge 3 of the lateral wall 2 is adjacently positioned to the base plate 7. A second edge 4 of the lateral wall 2 is oppositely positioned from the first edge 3 along the lateral wall 2 and delineates the front opening 10. As a result, the base plate 7 is positioned in between the first edge 3 of the lateral wall 2 and the second edge 4 of the lateral wall 2. The cylindrical compartment 9 is extended from the base plate 7 to the second edge 4 thus allowing to be accessed through the front opening 10. In reference to FIG. 4-5, the first mounting bracket 11 is externally connected to the lateral wall 2. The second mounting bracket 12 is externally connected to the lateral wall 2. The first mounting bracket 11 and the second mounting bracket 12 are diametrically opposed of each other about the housing 1 so that the housing 1 can be rotatably mounted to the stand 27 through the first mounting bracket 11 and the second mounting bracket 12. In the preferred embodiment of the present invention the housing 1 is made from metal; however, any other type of rigid material can be used to construct the housing 1. Additionally, in the preferred embodiment of the present invention, the housing 1 body is constructed from a single piece of material; however, the housing 1 can also be constructed from multiple sections which can be held together using any suitable means of connection.

Figure 6:
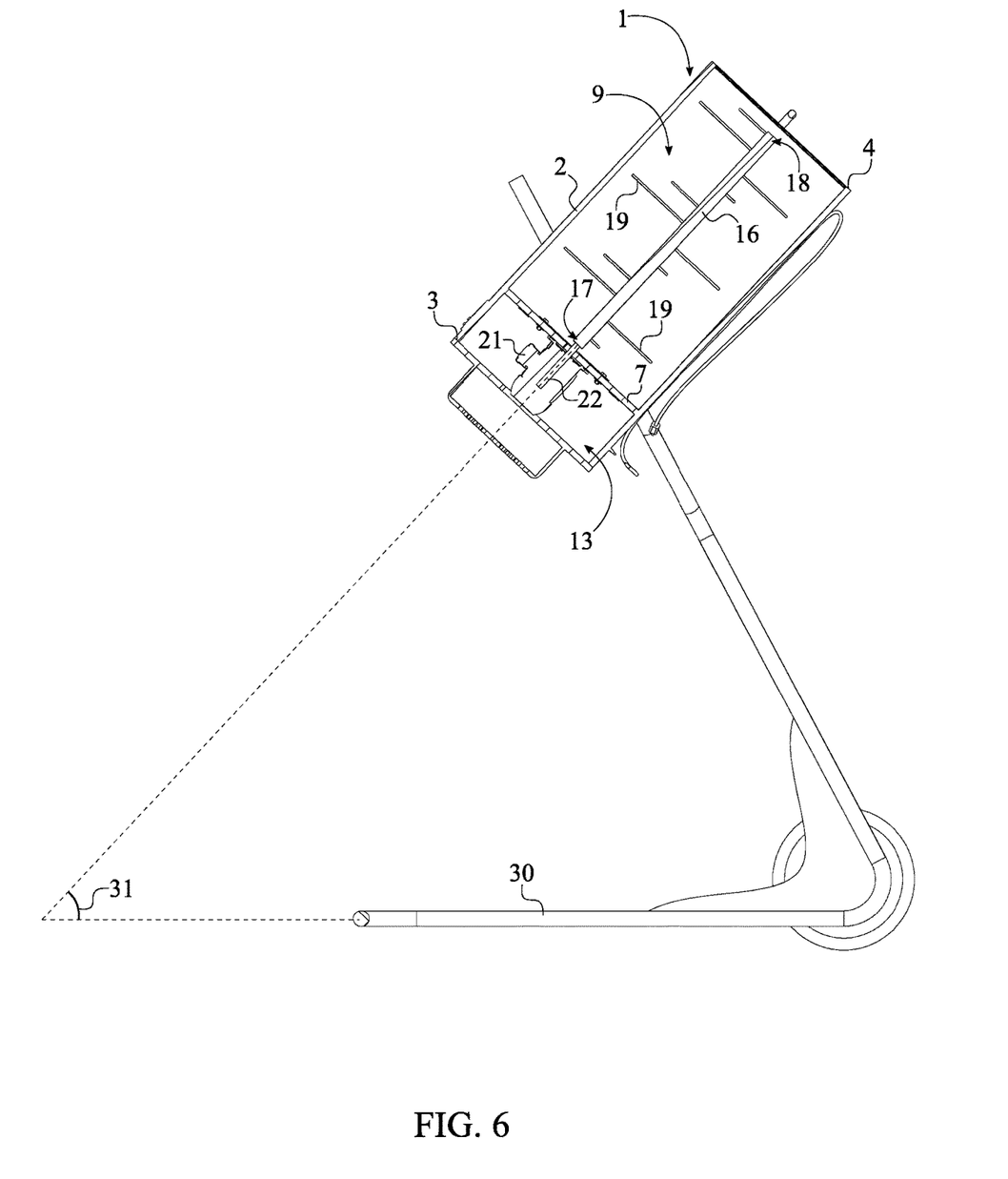
FIG. 6 is a cross section view for the preferred embodiment of the present invention taken along line A-A of FIG. 5 and showing the acute angle between the shredding axle and the base section.

The housing 1 further comprises a motor compartment 13 and an access panel 14 to enclose the motor 20 within the present invention as shown in FIG. 6. The motor compartment 13 is delineated by the base plate 7 and the lateral wall 2 and positioned opposite of the cylindrical compartment 9. More specifically, the motor compartment 13 is extended from the base plate 7 to the first edge 3 of the lateral wall 2. The motor compartment 13 protects the motor 20 from external elements that can negatively affect the functionality of the motor 20 and improves the esthetic appearance of the present invention. The access panel 14 is perimetrically mounted to the first edge 3 through a plurality of fasteners such as screw fasteners, male and female fasteners, and magnetic fasteners. As a result, the motor compartment 13 and the access panel 14 jointly enclose the motor 20 within the present invention. Furthermore, a plurality of ventilation holes of the present invention traverses through the access panel 14. The plurality of ventilation holes allows the heat energy that is generated through the operation of the motor 20 to be discharged from the present invention thus improving the reliability of the motor 20.

In an alternative embodiment of the present invention, the present invention comprises an access casing if the first edge 3 is terminally connected around the base plate 7. Due to the terminal connection of the first edge 3 and the base plate 7, the motor compartment 13 is omitted within the alternative embodiment of the present invention. As a result, the access casing is used to enclose the motor 20 as the access casing is perimetrically attached to the base plate 7 or the first edge 3 of the lateral wall 2 through a plurality of fasteners such as screw fasteners, male and female fasteners, and magnetic fasteners within the alternative embodiment of the present invention.

The shredding axle 15, which brakes the plant trimming into uniform sized particles, comprises a central shaft 16 and a plurality of shredding members 19. The central shaft 16 is a longitudinal member and concentrically positioned within the cylindrical compartment 9. The plurality of shredding members 19 is preferably thin tubular members composed of high density plastics that easily bend or flex under torsion. It should be easily conceivable to those with ordinary skills in the relevant arts, that the flexible members may possess a non-tubular shape and be composed of a non-polymeric material. The central shaft 16 provides a cylindrical surface area with the present invention to integrate the plurality of shredding members 19. In reference to FIG. 6, a proximal end 17 of the central shaft 16 is terminally coupled with the rotor 22 of the motor 20 so that the motor 20 is able to rotate the central shaft 16. The plurality of shredding members 19 traverses through the central shaft 16 in such a way that each shredding member 19 is radially positioned from the central shaft 16 with an even distribution of weight. More specifically, a first free end and a second free end of each shredding member 19 is positioned equidistant about the central shaft 16 to eliminate unnecessary vibration and to provide efficient shredding process during the operation to the present invention. Furthermore, in the preferred embodiment of the present invention, an arbitrary shredding member from the plurality of shredding members 19 and an adjacent shredding member from the plurality of shredding members 19 are positioned at a 45 degrees angle thus maintain the radial configuration for the plurality of shredding members 19. The plurality of shredding members 19 is extended from the proximal end 17 to a distal end 18 of the central shaft 16 so that the shredding axle 15 is able to fully utilize the total length of the cylindrical compartment 9 to shred plant trimmings.

The engagement between the proximal end 17 of the central shaft 16 and the rotor 22 of the motor 20 can be attained through a direct axial coupling or an indirect axial coupling. In reference to the direct axial coupling, the rotor 22 of the motor 20 traverses through the base plate 7 and into the cylindrical compartment 9 so that the proximal end 17 of the central shaft 16 can be axially coupled with the rotor 22 of the motor 20. In reference to the indirect axial coupling, the present invention utilizes a coupling member as the coupling member is rotatably integrated into the base plate 7 and each end of the coupling member is accessed from motor compartment 13 and the cylindrical compartment 9. As a result, the rotor 22 of the motor 20 is axially coupled with the coupling member from the motor compartment 13, and the proximal end 17 of the central shaft 16 is axially coupled with the coupling member from the cylindrical compartment 9.

Figure 7:
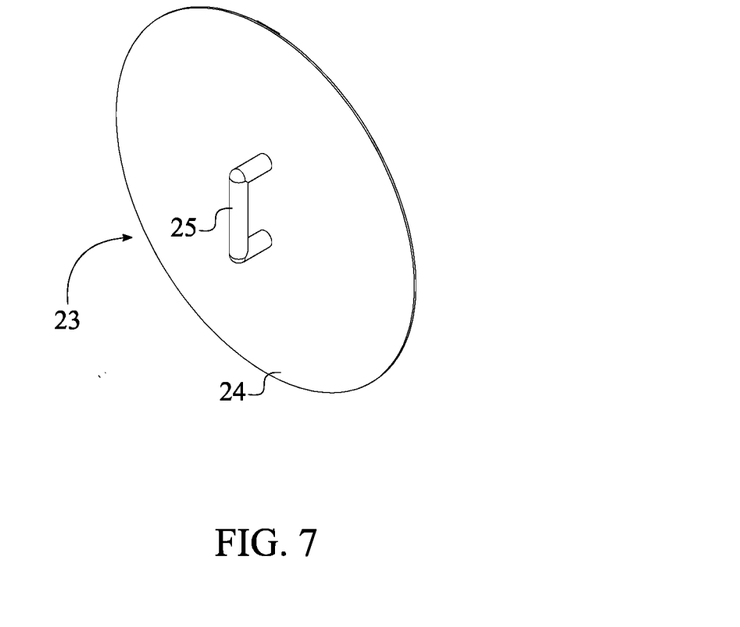
FIG. 7 is a front perspective view for the transparent lid of the present invention.
Figure 8:
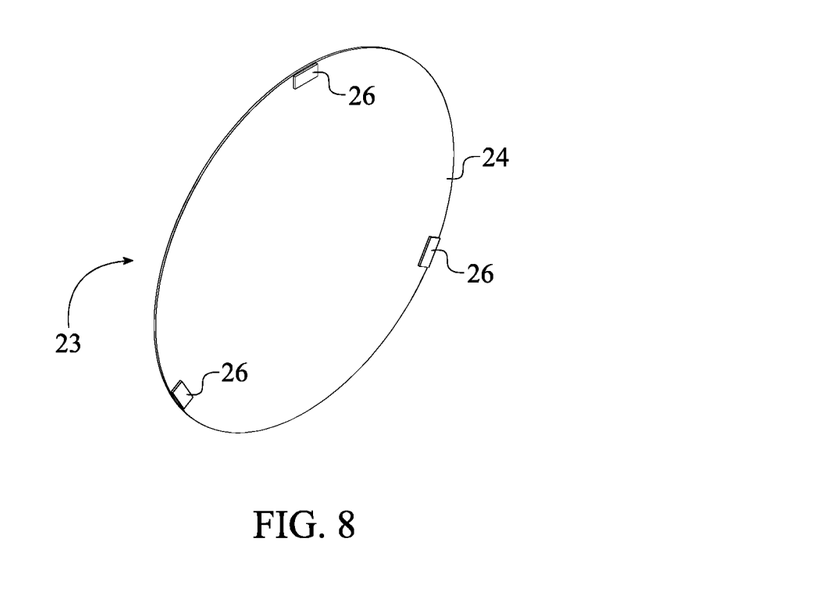
FIG. 8 is a rear perspective view for the transparent lid of the present invention.
Figure 9:
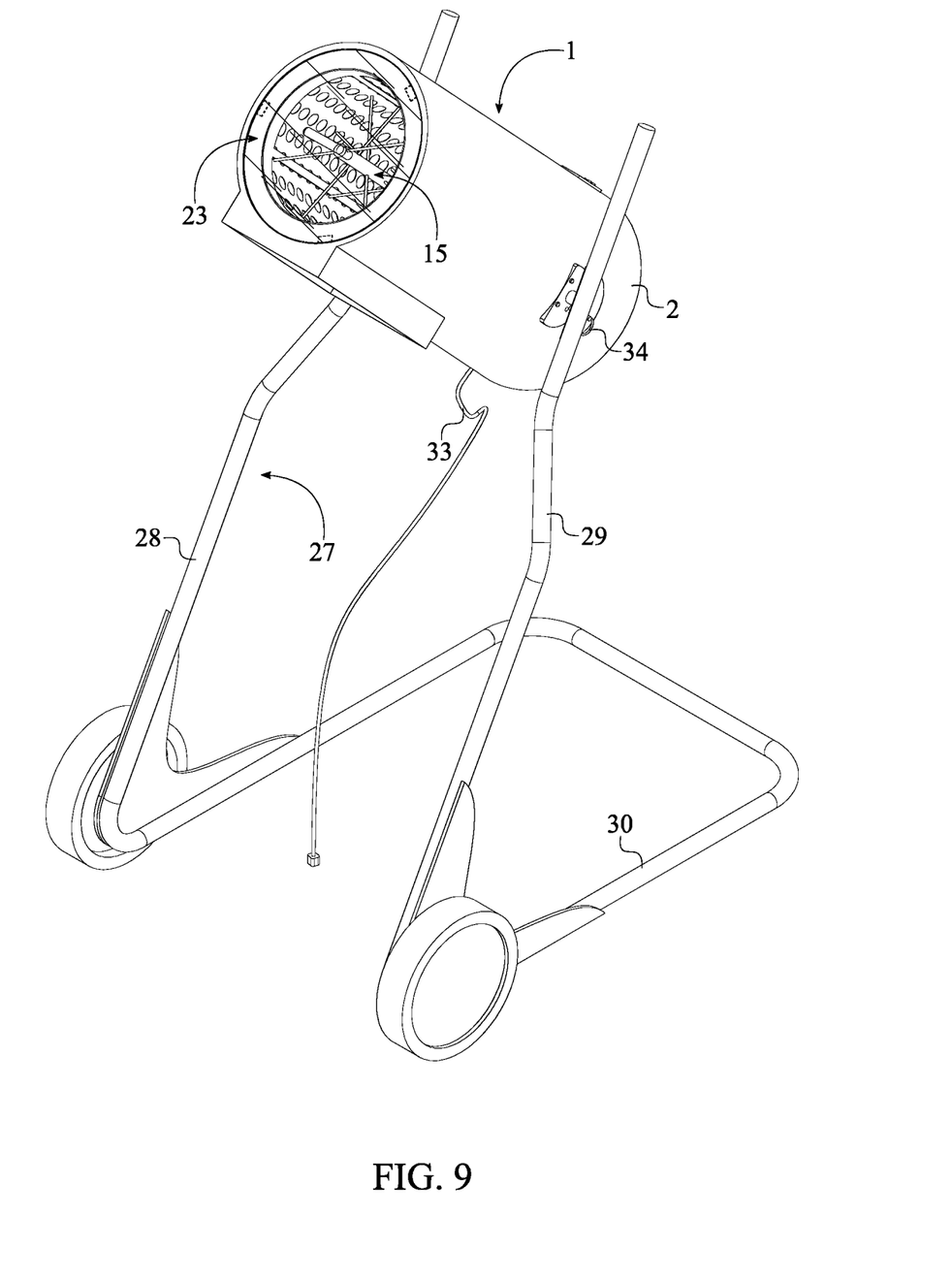
FIG. 9 is a top perspective view for the alternative embodiment of the present invention, showing the transparent lid.
Figure 10:
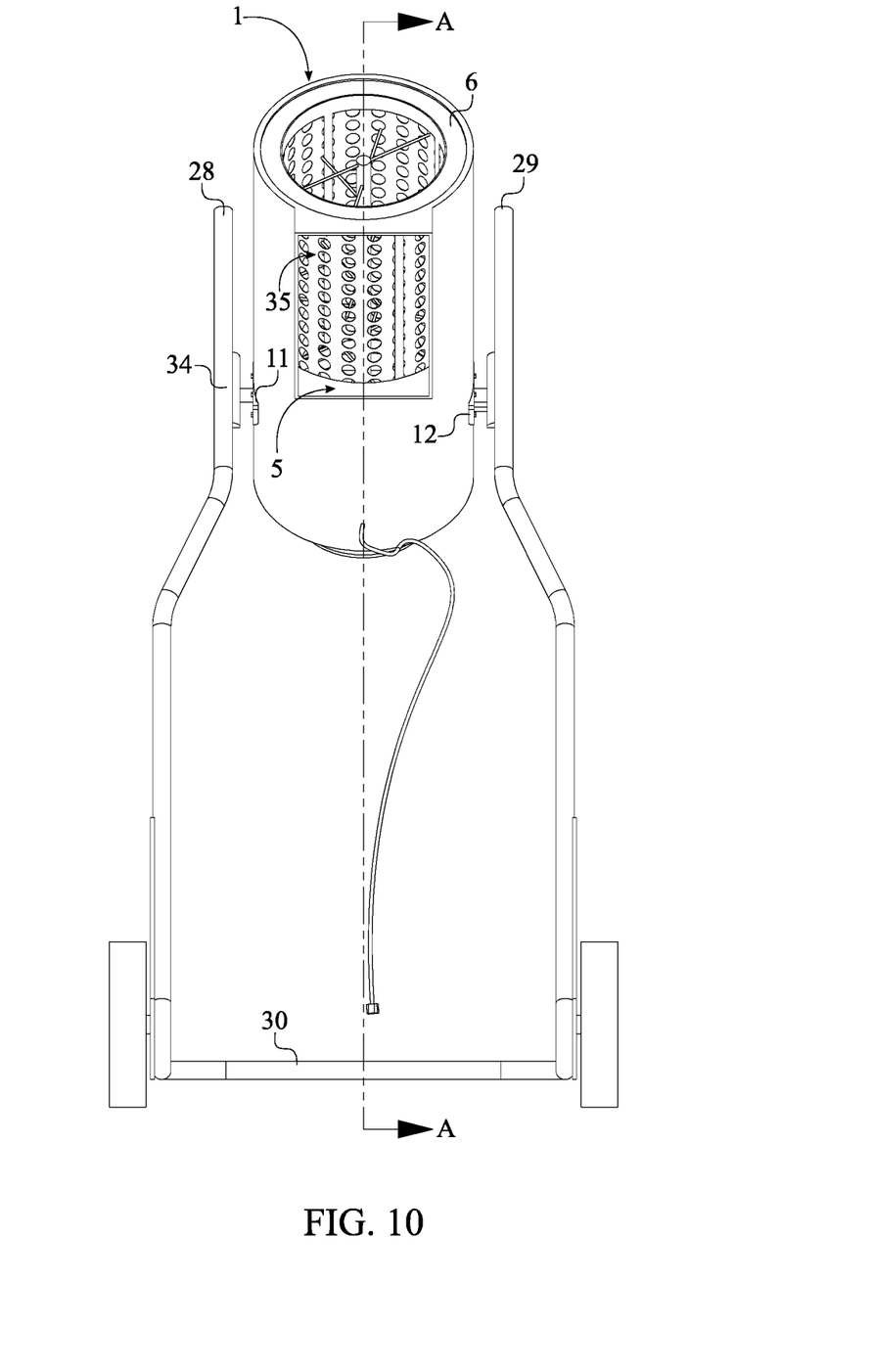
FIG. 10 is a front view for the alternative embodiment of the present invention, showing the plane upon which a cross sectional view is taken shown in FIG. 11.
Figure 11:
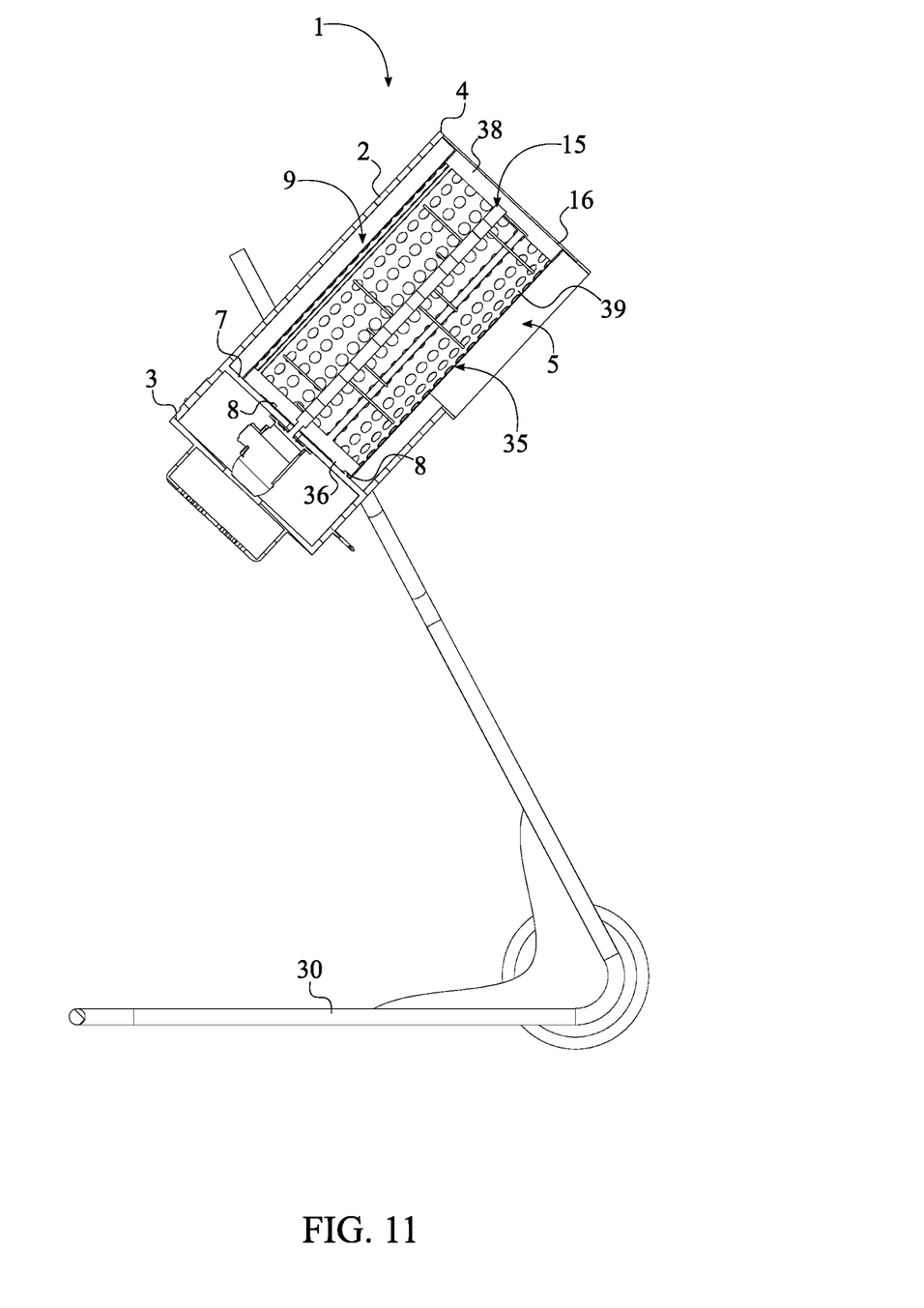
FIG. 11 is a cross section view for the preferred embodiment of the present invention taken along line A-A of FIG. 10, showing the cylindrical filter.
Figure 12:
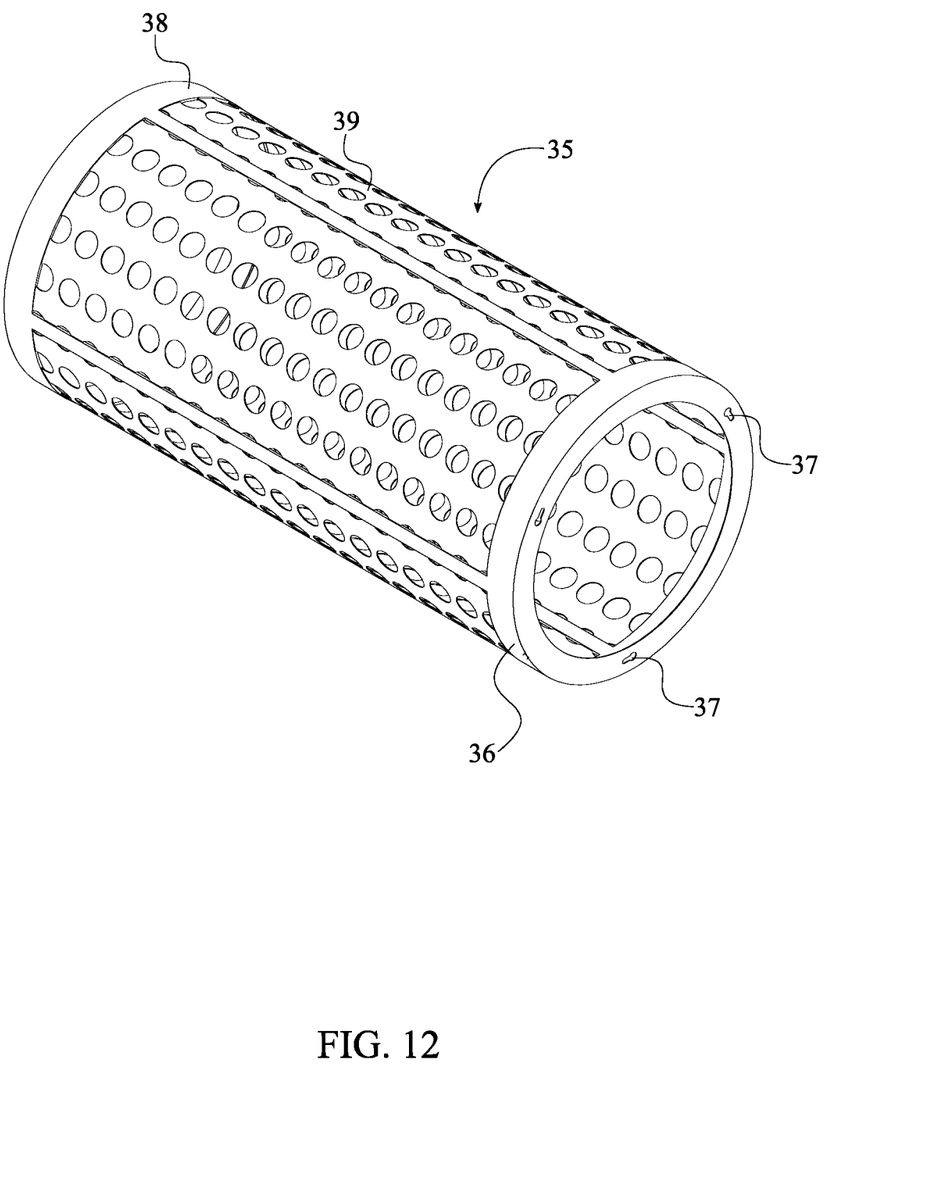
FIG. 12 is a perspective view for the cylindrical filter of the alternative embodiment of the present invention.

The present invention further comprises a lid 23 that is perimetrically attached to the second edge 4 of the lateral wall 2 in order to cover the front opening 10. In reference to FIG. 7-8, the lid 23 comprises a cover plate 24, a handle 25, and a plurality of quick release fasteners 26. In the preferred embodiment of the present invention, the cover plate 24 is made from transparent thermoplastic; however, the cover plate 24 can be made from any number of other materials. The cover plate 24 is shaped to fit the front opening 10 and prevents any outside elements from interfering with the shredding process. The handle 25 is externally connected to the cover plate 24 for easy removal or attachment of the cover plate 24 within the present invention. The plurality of quick release fasteners 26 is connected around the cover plate 24 so that the cover plate 24 can be attached to the second edge 4 of the lateral wall 2 by the plurality of quick release fasteners 26. In the preferred embodiment of the present invention, the cover plate 24 is secured to the housing 1 by a plurality of magnetic fasteners that functions as the plurality of quick release fasteners 26. However, it is also possible for the cover plate 24 to be secured to the lateral wall 2 or the second edge 4 by using any number of other fasteners, such as snap fit fasteners or latch fasteners.

The stand 27 that stabilize the elevated positioning of the housing 1 comprises a first leg 28, a second leg 29, and a base section 30. In reference to FIG. 4-5, the first leg 28 is terminally connected to the base section 30. The second leg 29 is terminally connected to the base section 30 and positioned opposite of the first leg 28. As a result, the first leg 28 and the second leg 29 form an opening between the two components so that the housing 1 can be rotatably mounted within the opening. More specifically, the lateral wall 2 is rotatably connected to the first leg 28 by the first mounting bracket 11. The lateral wall 2 is rotatably connected to the second leg 29 by the second mounting bracket 12. When the present invention is operational, the shredding axle 15 and the base section 30 are selectively engaged at an acute angle 31 by a locking mechanism 34 in order to maintain a stationary position for the housing 1. In the preferred embodiment of the present invention, the acute angle 31 ranges from 60 degrees to 7 degrees so that the user is able to attain multiple stationary positions for the housing 1. For example, the housing 1 can be locked at 45 degrees or 23.5 degrees through the locking mechanism 34. In the preferred embodiment of the present invention, the locking mechanism 34 is a locking pin that can engage with the first leg 28 and the first mounting bracket 11 or the second leg 29 and the second mounting bracket 12 to attain the stationary position. However, the locking mechanism 34 is not limited to the locking pin and can include, but is not limited to, a push button lock, a latch lock, and a magnetic lock. Once the shredding process is completed, the locking mechanism 34 can be disengaged to tilt down housing 1 so that uniform sized particles can be removed through the front opening 10 along with the removal of the lid 23.

Figure 4:
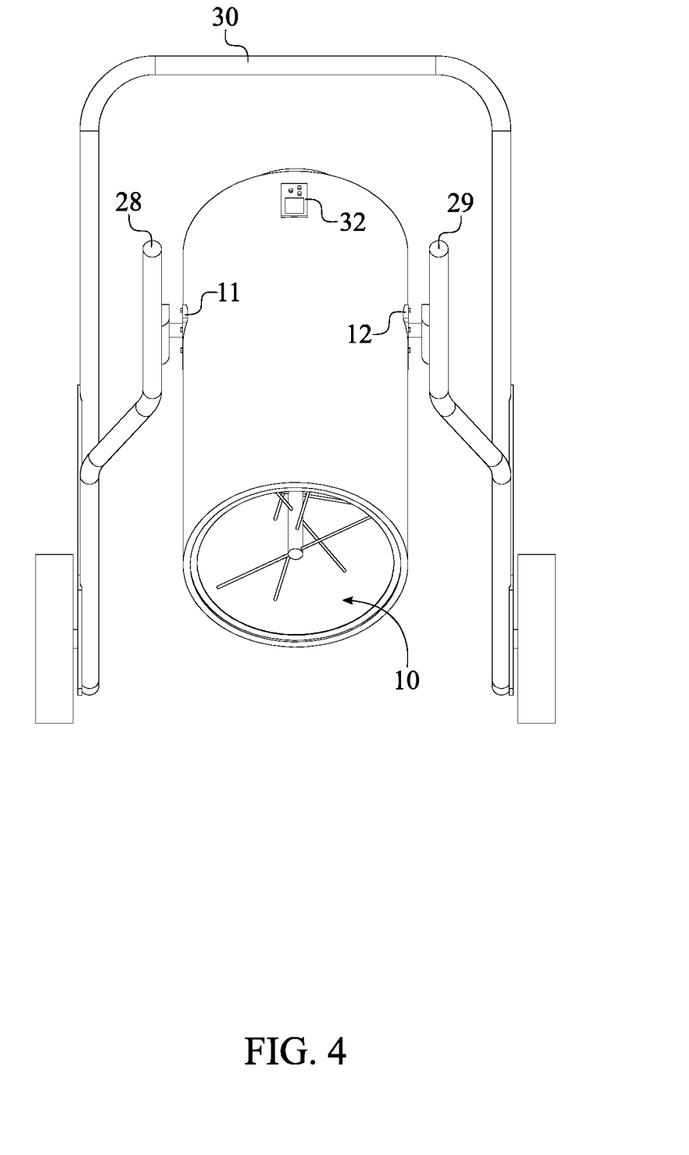
FIG. 4 is a top view for the preferred embodiment of the present invention, without the transparent lid.
Figure 5:
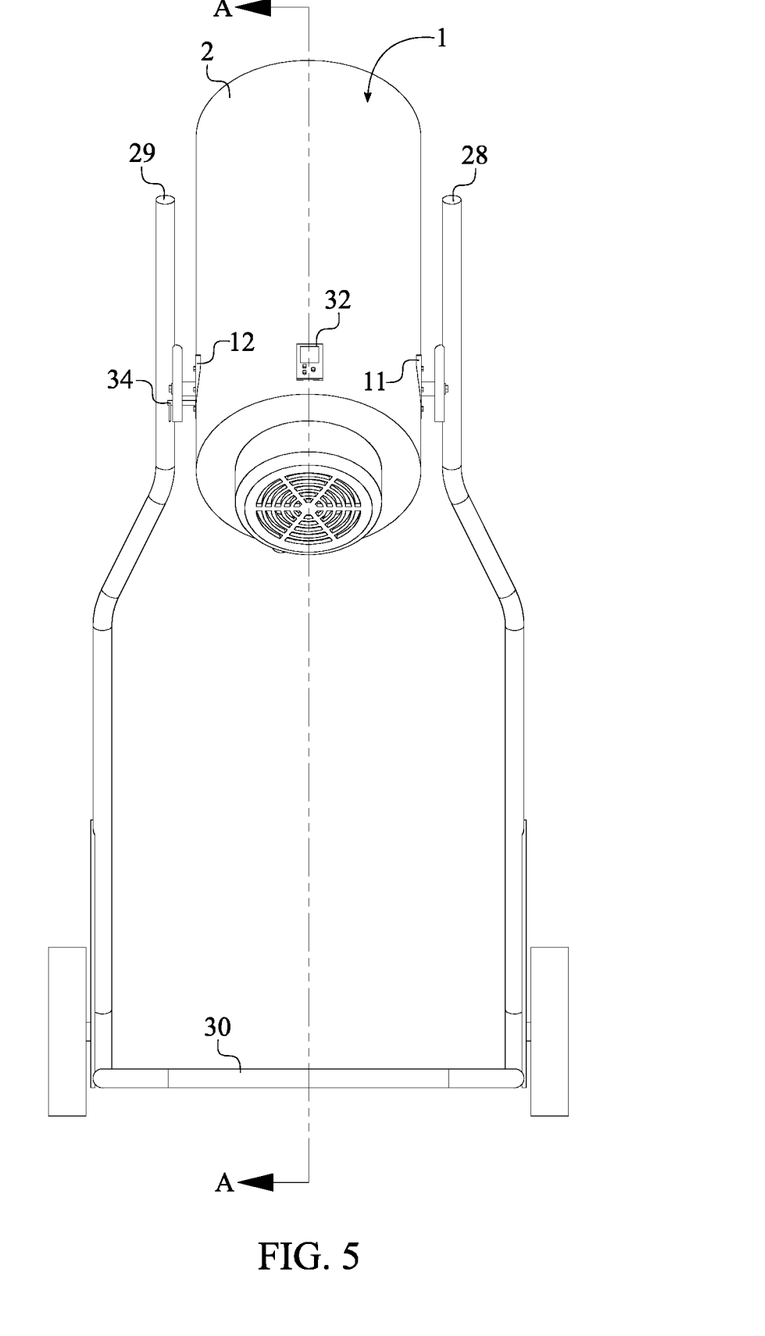
FIG. 5 is a rear view for the preferred embodiment of the present invention, showing the plane upon which a cross sectional view is taken shown in FIG. 6.

In reference to FIG. 3-4, the digital timer 32 digital timer 32 functions as a means to record a discrete time interval which allows the user to determine the operational time duration for the motor 20. Since the motor 20 and the digital timer 32 are electrically connected to power cord 33, the digital timer 32 is also powered through the power cord 33 in addition to the motor 20. As a result, the digital timer 32 acts as a power switch responsible for actuating the motor 20 in addition to the setting the operational time duration for the motor 20. The power cord 33 can be attached to any external power outlet that can provide the electrical current required to power the motor 20 and the digital timer 32. The operational time duration of the present invention determines actual particle size for the plant trimmings. For example, three seconds of operational time duration outputs larger sized particles compare to five second of operational time duration that outputs smaller sized particles.

In an alternative embodiment of the present invention, the housing 1 further comprises a discharge opening 5, a flange 6, and a cylindrical filter 35 as shown in FIG. 9-12. More specifically, the discharge opening 5 traverses through the lateral wall 2 and positioned adjacent to the front opening 10. The flange 6 is perimetrically connected around the second edge 4 of the lateral wall 2 and inwardly extended toward the shredding axle 15. The cylindrical filter 35 is concentrically attached to the base plate 7 as the cylindrical filter 35 is positioned in between the shredding axle 15 and the lateral wall 2. More specifically, the cylindrical filter 35 comprises a first ring 36, a second ring 38, and a mesh cylinder body 39. The first ring 36 is terminally connected to the mesh cylinder body 39. The second ring 38 is terminally connected to the mesh cylinder body 39, opposite of the first ring 36. A plurality of female attachments 37 of the first ring 36 is engaged with a plurality of male attachments 8 of the base plate 7 so that the user is able to easily attach and detach the cylindrical filter 35. The plant trimmings are loaded to the cylindrical filter 35 through the front opening 10 so that the cylindrical filter 35 is able to retain debris and stems during the shredding process while allowing uniform sized particles to filter through the mesh cylinder body 39. The filtered particles are then simultaneously dropped through the discharge opening 5 during the shredding process. Any amount of collected filtered particles within the cylindrical compartment 9 can be removed through the front opening 10 or the discharge opening 5 by tilting down housing 1 after the shredding process.

Although the invention has been explained in relation to its preferred embodiment, it is to be understood that many other possible modifications and variations can be made without departing from the spirit and scope of the invention as hereinafter claimed.

What is claimed is:

1. A foliage shredder comprises: a housing; a shredding axle; a motor; a stand; a digital timer; a power cord; the housing comprises a lateral wall, a base plate, and a cylindrical compartment; the lateral wall being perimetrically connected around the base plate; the cylindrical compartment being delineated by the lateral wall and the base plate; a lid on an end of the housing opposite the base plate; wherein the housing completely encloses a central shaft and a plurality of shredding members, the lid being openable to access an interior thereof; the lateral wall being rotatably mounted to the stand; a stator of the motor being externally mounted onto the base plate; the shredding axle being concentrically positioned within the cylindrical compartment; the shredding axle being rotatably coupled to a rotor of the motor; the digital timer being externally mounted onto the lateral wall; the motor being electrically connected to the power cord through the digital timer; the shredding axle comprises the central shaft and the plurality of shredding members; the shredding members being flexible; a proximal end of the central shaft being axially coupled with the rotor of the motor; the plurality of shredding members traversing through the central shaft; the plurality of shredding members each extending radially from the central shaft; the plurality of shredding members being positioned at separate locations spaced axially along the central shaft from the proximal end to a distal end of the central shaft; and the housing configured to operate while closed by the lid to shred a batch of foliage while closed;

the housing further comprises a discharge opening, a flange, and a cylindrical filter; the discharge opening traversing through the lateral wall; the flange being perimetrically connected around a second edge of the lateral wall; the flange being inwardly extended toward the shredding axle; the cylindrical filter being concentrically attached to the base plate; and the cylindrical filter being positioned in between the shredding axle and the lateral wall.

2. The foliage shredder as claimed in claim 1 comprises: the lateral wall comprises a first edge and a second edge; the first edge being adjacently positioned to the base plate; the second edge being oppositely positioned from the first edge along the lateral wall; the cylindrical compartment being extended from the base plate to the second edge; and a front opening being delineated by the second edge, wherein the cylindrical compartment is accessed through the front opening.

3. The foliage shredder as claimed in claim 1 comprises: the housing further comprises a motor compartment and an access panel;
the motor compartment being delineated by the base plate and the lateral wall, opposite of the cylindrical compartment;

the motor compartment being extended from the base plate to the first edge;

the access panel being perimetrically mounted to the first edge; and the motor being enclosed within the motor compartment and the access panel.

4. The foliage shredder as claimed in claim 1 comprises:
the lid being perimetrically attached to a second edge of the lateral wall, wherein a front opening of the housing is covered by the lid.

5. The foliage shredder as claimed in claim 4 comprises:
the lid comprises a cover plate, a handle, and a plurality of quick release fasteners;
the handle being externally connected to the cover plate;
the plurality of quick release fasteners being connected around the cover plate; and
the cover plate being attached to the second edge by the plurality of quick release fasteners.

6. The foliage shredder as claimed in claim 1 comprises:
the stand comprises a first leg, a second leg, and a base section;
the housing further comprises a first mounting bracket and a second mounting bracket;
the first leg being terminally connected to the base section;
the second leg being terminally connected to the base section, opposite of the first leg;
the first mounting bracket being externally connected to the lateral wall;
the second mounting bracket being externally connected to the lateral wall;
the first mounting bracket and the second mounting bracket being diametrically opposed of each other;
the lateral wall being rotatably connected to the first leg by the first mounting bracket;
the lateral wall being rotatably connected to the second leg by the second mounting bracket; and
the shredding axle and the base section being selectively engaged at an acute angle by a locking mechanism.

7. The foliage shredder as claimed in claim 6, wherein the acute angle ranges from 60 degrees to 7 degrees.

8. The foliage shredder as claimed in claim 1 comprises:
the base plate comprises a plurality of male attachments; the cylindrical filter comprises a first ring, a second ring, and a mesh cylinder body: the first ring being terminally connected to the mesh cylinder body; the second ring being terminally connected to the mesh cylinder body, opposite of the first ring; and a plurality of female attachments of the first ring being engaged with the plurality of male attachments.

9. The foliage shredder of claim 1 wherein the plurality of shredding members radially extend from the central shaft at various different locations on the central shaft axially spaced from each other.

10. A foliage shredder comprises: a housing; a shredding axle; a motor; a digital timer; the housing comprises a lateral wall, a base plate, and a cylindrical compartment; the lateral wall being perimetrically connected around the base plate; the cylindrical compartment being delineated by the lateral wall and the base plate; a lid on an end of the housing opposite the base plate; wherein the housing completely encloses a central shaft and a plurality of shredding members, the lid being openable to access an interior thereof; a stator of the motor being externally mounted onto the base plate; the shredding axle being positioned within the cylindrical compartment; the shredding axle being rotatably coupled to a rotor of the motor; the motor being electrically connected to the digital timer; the shredding axle comprises the central shaft and the plurality of shredding members; the shredding members being flexible; a proximal end of the central shaft being axially coupled with the rotor of the motor; the plurality of shredding members being positioned at separate locations spaced axially along the central shaft from the proximal end to a distal end of the central shaft; the plurality of shredding members traversing through the central shaft; and the housing configured to operate while closed by the lid to shred a batch of foliage while closed;

the housing further comprises a discharge opening, a flange, and a cylindrical filter; the discharge opening traversing through the lateral wall; the flange being perimetrically connected around a second edge of the lateral wall; the flange being inwardly extended toward the shredding axle; the cylindrical filter being concentrically attached to the base plate; and the cylindrical filter being positioned in between the shredding axle and the lateral wall.

11. The foliage shredder of claim 10 wherein the plurality of shredding members radially extend from the central shaft at various different locations on the central shaft axially spaced from each other.

12. The foliage shredder of claim 1 wherein said central shaft includes holes passing therethrough, said plurality of shredding members traversing through said holes in said central shaft.

13. The foliage shredder of claim 12 wherein said holes pass through a central axis of said central shaft.

14. The foliage shredder of claim 12 wherein said holes are spaced axially from each other.

15. The foliage shredder of claim 14 wherein each of said holes has ends which are angularly offset from ends of other said holes passing through said central shaft, such that the shredding members are non-parallel with adjacent shredding members.

16. The foliage shredder of claim 10 wherein said central shaft includes holes passing therethrough, said plurality of shredding members traversing through said holes in said central shaft.

17. The foliage shredder of claim 16 wherein said holes pass through a central axis of said central shaft;
wherein said holes are spaced axially from each other; and
wherein each of said holes has ends which are angularly offset from ends of other said holes passing through said central shaft, such that the shredding members are non-parallel with adjacent shredding members.

* * * * *